(12) United States Patent
Chengour

(10) Patent No.: US 11,300,212 B2
(45) Date of Patent: Apr. 12, 2022

(54) DEVICE FOR REGULATING THE PRESSURE OF FLUIDS

(71) Applicant: KAMAT GmbH & Co. KG, Witten-Annen (DE)

(72) Inventor: Mohammed Chengour, Neukirchen-Vluyn (DE)

(73) Assignee: KAMAT GmbH & Co. KG, Witten-Annen (DE)

( * ) Notice: Subject to any disclaimer, the term of this patent is extended or adjusted under 35 U.S.C. 154(b) by 0 days.

(21) Appl. No.: 17/051,792

(22) PCT Filed: May 2, 2019

(86) PCT No.: PCT/EP2019/061185
§ 371 (c)(1),
(2) Date: Oct. 30, 2020

(87) PCT Pub. No.: WO2019/211352
PCT Pub. Date: Nov. 7, 2019

(65) Prior Publication Data
US 2021/0123531 A1     Apr. 29, 2021

(30) Foreign Application Priority Data
May 3, 2018 (DE) .................. 10 2018 110 563.0

(51) Int. Cl.
*F16K 1/42* (2006.01)
*F16K 1/36* (2006.01)
*F16K 1/44* (2006.01)

(52) U.S. Cl.
CPC .................. *F16K 1/42* (2013.01); *F16K 1/36* (2013.01); *F16K 1/44* (2013.01)

(58) Field of Classification Search
CPC ................. F16K 1/42; F16K 1/44; F16K 1/36
USPC ........................................... 251/62
See application file for complete search history.

(56) References Cited

U.S. PATENT DOCUMENTS

| 2,866,477 | A | 12/1958 | Bredtschneider et al. |
| 2,870,764 | A | 1/1959 | Carlson et al. |
| 5,718,410 | A | 2/1998 | Baumann |
| 7,527,238 | B2 * | 5/2009 | Sakurai et al. ......... F16K 41/18 251/62 |
| 8,752,807 | B2 | 6/2014 | Nomichi et al. |
| 10,359,119 | B2 * | 7/2019 | Wangemann et al. .... F16K 1/46 |

(Continued)

FOREIGN PATENT DOCUMENTS

| DE | 19602796 A1 | 8/1996 |
| JP | 2002188732 A | 7/2002 |
| WO | 2016134909 A1 | 9/2016 |

*Primary Examiner* — Kevin L Lee
(74) *Attorney, Agent, or Firm* — The Webb Law Firm

(57) ABSTRACT

A device (1) is represented and described for regulating the pressure of fluids, comprising: a valve housing (6) with an inlet (16) and with an outlet (15), a closure element (2), which is arranged inside the valve housing (6), and a valve seat (3), which is arranged inside the valve housing (6), wherein the closure element (2) is mounted so as to be movable and wherein the closure element (2) and the valve seat (3) are arranged such that the connection between the inlet (16) and the outlet (15) can be opened and partially or fully closed. In order to prevent the closure element (2) and the valve seat (3) becoming stuck in the case of an abrupt fall in pressure, it is proposed that the valve seat (3) is mounted so as to be movable.

10 Claims, 4 Drawing Sheets

(56) References Cited

U.S. PATENT DOCUMENTS

| | | | |
|---|---|---|---|
| 10,704,705 B2* | 7/2020 | Zlatintsis | F16K 1/42 |
| 2005/0265853 A1* | 12/2005 | Hirota | F04B 49/225 |
| | | | 417/222.2 |
| 2009/0078428 A1 | 3/2009 | Mi | |
| 2015/0083948 A1* | 3/2015 | Bleeck et al. | F16K 31/06 |
| | | | 251/129.19 |
| 2019/0024803 A1* | 1/2019 | Sander | F16K 1/465 |
| 2020/0300377 A1 | 9/2020 | Zlatintsis | |

* cited by examiner

DEVICE FOR REGULATING THE PRESSURE OF FLUIDS

CROSS-REFERENCE TO RELATED APPLICATIONS

This application is the United States national phase of International Application No. PCT/EP2019/061185 filed May 2, 2019, and claims priority to German Patent Application No. 10 2018 110 563.0 filed May 3, 2018, the disclosures of which are hereby incorporated by reference in their entirety.

BACKGROUND OF THE INVENTION

Field of the Invention

The invention relates to a device for regulating the pressure of fluids, comprising: a valve housing with an inlet and with an outlet, a closure element, which is arranged inside the valve housing, a valve seat, which is arranged inside the valve housing, with the closure element being mounted so as to be movable, and with the closure element and the valve seat being arranged such that the connection between the inlet and the outlet can be opened and partially or fully closed.

Description of Related Art

In the case of many applications, it is required to regulate the pressure of fluids and for example to set it to a constant pressure. For this purpose, so-called overpressure valves or pressure limiting valves and throttle valves are known. Such valves drain fluids from a system when a certain pressure is exceeded in order to prevent a further rise in pressure. Following the response from the valve and the reduction in the excessively high pressure by discharging fluid, the valve closes again. The drained fluids can be collected, returned or discharged into the environment.

Particular challenges are posed in the case of using pressure regulating valves in high-pressure systems, i.e. for example in the case of pressures of more than 1000 bar. In order to achieve functioning pressure regulation even at very high pressures, the components responsible for the sealing (e.g. valve seat and valve plug) must be pressed on one another with significant force which may lead to the valve seat and the valve plug possibly becoming stuck. The danger of them becoming stuck exists in particular in the case of an abrupt drop in pressure, which for example may occur in the case of a pump failure or a defect on a hose. Valves that become stuck lead to downtimes and high maintenance costs and must therefore be avoided. The danger of them becoming stuck exists in particular in the case of self-locking components, for example a valve plug with an acute taper angle. Such components are, in spite of the self-locking, used because of their good ability to regulate.

Against this background, the object underlying the invention is to design and further develop the device for regulating the pressure of fluids mentioned at the outset and described previously in greater detail such that even in the case of an abrupt drop in pressure there is no risk of valve becoming stuck.

SUMMARY OF THE INVENTION

This object is achieved in the case of a device wherein the valve seat is mounted so as to be movable.

The invention relates to a device for regulating the pressure of fluids, in particular for setting and/or limiting the maximum pressure of fluids. The fluids may for example be gases such as air or primarily liquids such as water. The device firstly comprises a valve housing with an inlet and an outlet. A fluid can flow into the valve housing through the inlet; it can flow back out of the valve housing through the outlet. Inlets and outlets can also generally be designated as "connectors" such that it concerns a valve housing with at least two connectors. The valve housing is preferably made of metal. The device also comprises a closure element, which is arranged inside the valve housing, and the closure element can be arranged partially or fully in the valve housing. The closure element may for example be a valve plug. Additionally, the device comprises a valve seat, which is arranged inside the valve housing, and the valve seat can also be arranged partially or fully in the valve housing. The closure element is mounted so as to be movable in order to move in the direction of the valve seat and in the opposite direction, whereby the valve formed by these components can be opened and partially or fully closed. During operation, the valve is usually in a partially closed position, whereby "throttling" is achieved. The valve can preferably be adjusted continuously between the opened and closed position. The closure element should in particular be mounted so as to be movable relative to the valve housing. The closure element can be actuated in a different manner, for example pneumatically, hydraulically, electrically or (purely) mechanically (e.g. by a pre-loaded spring). The closure element and the valve seat are arranged such that the connection between the inlet and the outlet can be opened and partially or fully closed. The connection between the inlet and the outlet can in particular be opened and closed or throttled for fluids in that the closure element and the valve seat are compressed or pulled apart from one another. This requirement is achieved by corresponding dimensioning and arrangement of the individual components.

According to the invention, it is provided that the valve seat is mounted so as to be movable. In order to open and close a valve, a relative movement is required between the closure element and the valve seat. According to the invention, this relative movement is not achieved solely by a movable mounting of the closure element; instead, the valve seat should also be mounted so as to be movable. The valve seat should in particular be mounted so as to be movable relative to the valve housing. Due to the movable mounting of the valve seat, it can be called a "floating" valve seat. The valve can thus, like the closure element, assume different positions. The position of the closure element and the valve seat are therefore not determined by a rigid installation position, but rather by the relationship of pressure and counter pressure or force and counterforce which act on the closure element and (opposingly) on the valve seat. The "floating" mounting allows the valve seat to be pressed in one direction in the case of an abrupt drop in pressure due to the balance no longer existing and therefore it can "give in". The movability of the valve seat leads to friction-related movement energy during the deflection movement of the valve seat being converted into heat. This allows a smoother stopping of the valve seat and therefore a reduced risk of becoming stuck. The closure element can thus also be pulled out of the valve seat without becoming stuck following an abrupt drop in pressure, after the counter pressure has been reduced.

An advantageous configuration of the device provides that a stroke between the valve seat and its lower stop is greater in the case of the closed valve position than a stroke between the piston and its lower stop. The "lower" stop can in particular be understood as such the stop which is closer to the inlet (and possibly a pump connected thereto and a consumer connect thereto) than the opposing, "upper" stop. It may thus concern the inlet-side stop. By the stroke of the piston being shorter in the direction of the inlet than the stroke of the valve seat in the same direction, the movement of the piston in this direction is limited earlier than the movement of the valve seat. This has for example the advantage in the case of a sudden drop in pressure in the region of the inlet that the piston, during its movement in the direction of the inlet, is slowed down earlier (by contact with the stop) than the valve seat, whereby a fixed compression and sticking of closure element and valve seat are prevented.

According to a configuration of the device, it is provided that the valve seat is mounted so as to be linearly movable between a first stop and a second stop. A linear movability can constructively be particularly easy to implement and also has the advantage of a good ability to regulate the valve. The stops serve to limit the extent of the movability of the valve seat, i.e. the limitation of the "stroke". The valve seat is preferably mounted so as to be linearly movable continuously between the first stop and the second stop.

According to a further design of the device, it is provided that the valve seat has a stroke in the range of between 2 mm and 20 mm. A stroke in the range of the indicated limits has proven to be a good compromise between a good response behaviour (shorter stroke preferred) and a best possible "damping" of the impact in the case of an abrupt drop in pressure (greater stroke preferred).

In a further design of the device, it is proposed that the valve seat is mounted so as to be movable in a valve seat guide and/or that the closure element is mounted so as to be movable in a valve guide. In other words, it may be provided that the movably mounted components (valve seat, closure element) have no direct contact to the inner wall of the valve housing, but rather are mounted so as to be movable in the valve housing indirectly, namely via guide elements such as for example a valve guide or valve seat guide. This has the advantage that such guide elements can be optimised as best as possible for precise guidance, good sealing and low wear. This can for example be achieved by a suitable choice of material. In particular, it may be provided that the guide elements are made of a different material than the valve housing.

According to a further configuration of the device, it may be provided that the closure element is designed as a valve plug. The closure element can be designed partially or fully in a cone-shape. The valve seat preferably also has a cone-shaped opening or a cone-shaped channel in the case of this configuration. A cone-shaped design has the advantage that a circumferential gap is formed between the closure element and the valve seat, whose gap width can be very precisely set by a relative movement between closure element and valve seat. Due to its rotationally-symmetric shape, a cone can also have the advantage that a correction of the rotational position does not have to take place when inserting the valve plug. The valve plug advantageously has a cone angle or opening angle (angle between opposing sides of the shell surface) in the range of between 3° and 8°, in particular between 4° and 6°.

According to a further design of the device, it is provided that the valve seat has a channel. The channel serves the purpose of a fluid being able to flow through the valve seat. In addition, the closure element can be inserted into the channel, and a self-centring can take place. The channel preferably has a rotationally-symmetric shape (e.g. cylindrical or cone-shaped) such that the closure element can be inserted into the channel without a correction of the rotational position having to take place. The channel can be designed partially or fully rotationally-symmetric.

A further development of the device is characterised by a cylinder housing with a piston mounted so as to be movable therein, which is connected to the closure element. A hydraulic or pneumatic actuation of the device can be achieved by a cylinder housing and a piston mounted therein. In particular, the movement of the closure element can take place hydraulically or pneumatically. The closure element can be connected directly or indirectly (for example via a closure element support and a ball) to the piston.

Regarding this further development, it is also proposed that the cylinder housing has a pressurised air opening to connect a pressurised air unit. Through a connector, the device can use external pressurised air units, usually present anyway, such that the device does not have to have its own pressurised air unit. A pneumatic drive is characterised by significant robustness, additionally, ambient air can be used as the working medium.

A further configuration of the device is characterised by a T-piece connected to the inlet to connect a pump and a consumer. Through a T-piece, i.e. an adapter with three connectors, the device can be used to regulate the pressure in a fluid line, by a connector of the T-piece being connected to the device and by the other two connectors of the T-piece being connected to one fluid line in each case.

The device is suitable in particular for use in a high-pressure system with at least 1000 bar, in particular at least 2000 bar. The good suitability for high-pressure applications is due to the fact that owing to the movable mounting of the valve seat, there is no risk of becoming stuck even in the case of very high pressures if an abrupt drop in pressure occurs.

BRIEF DESCRIPTION OF THE DRAWINGS

The invention is explained in more detail below on the basis of drawings merely representing a preferred exemplary embodiment. In the drawings is shown.

DESCRIPTION OF THE INVENTION

Figure 1:
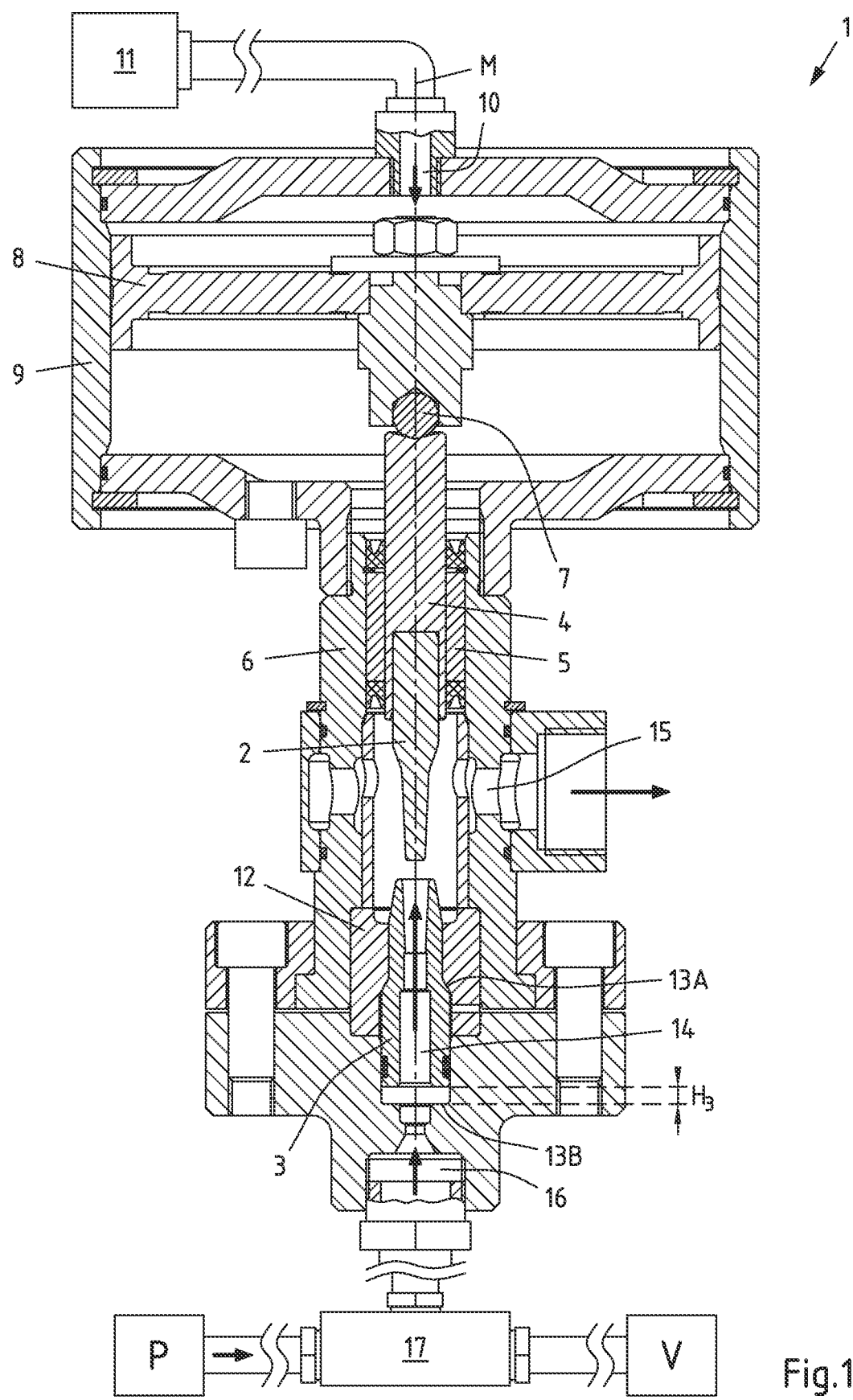
FIG. 1 a device according to the invention for regulating the pressure in a first valve position, FIG. 2 the device from FIG. 1 in a second valve position, FIG. 3 the device from FIG. 1 in a third valve position, and FIG. 4 the device from FIG. 1 in a fourth valve position.

FIG. 1 shows a device 1 according to the invention for regulating the pressure in a first valve position. The device 1 comprises a closure element 2 designed as a valve plug and a valve seat 3. The closure element 2 and the valve seat 3 are mounted so as to be movable relative to one another and together form a valve, which can be opened and partially or fully closed, i.e. "throttled". In the position shown in FIG. 1, the closure element 2 and the valve seat 3 are separated from one another, it thus concerns an open valve position. The closure element 2 is connected to a closure element support 4, which is mounted so as to be displaceable in a valve guide 5, which is arranged in a valve housing 6, which has a central axis M. The closure element support 4 is connected via a ball 7 to a piston 8 on the side opposite the closure element 2. The piston 8 is arranged in a cylinder housing 9 connected to the valve housing 6 and is displaceable inside the cylinder housing 9 along the central axis M. The closure element support 4 is sealed off from the valve housing 6 such that fluid cannot flow between the region above the closure element support 4 (in particular the cylinder housing 9) and the region below the closure element support 4 (in particular the region of the closure element 2 and the valve seat 3). The cylinder housing 9 has a pressurised air opening 10 which can be connected to a pressurised air unit 11. In the case of the position shown in FIG. 1, the pressurised air unit 11 is deactivated such that the piston 8 is located in an "upper" position (close to the pressurised air opening 10).

The valve seat 3 is mounted so as to be displaceable in a valve seat guide 12, which has an upper stop 13A. The valve seat 3 can be pushed into the valve seat guide 12, until it abuts on the upper stop 13A. The device 1 also has a lower stop 13B for the valve seat 3. The valve seat 3 can therefore be displaced between the upper stop 13A and the lower stop 13B, with it covering a stroke $H_3$ in the direction of the central axis M. The valve seat 3 is designed hollow and has a channel 14 such that fluid can flow through it. The valve housing 6 has an outlet 15 though which fluid flowing through the open valve can flow back out of the device 1. At its lower end, the device 1 has an inlet 16 to which the fluid flow to be regulated can be connected. For example, the inlet can be connected to a T-piece 17 which connects a pump P to a consumer V.

The position represented in FIG. 1 is an open valve position which allows the pump P to be operated in a pressureless circulating operation. To this end, a fluid, for example water, flows from the pump P firstly into the T-piece 17 and from there into the inlet 16 of the device. From there, the fluid flows further through the channel 14 of the valve seat 3 past the opened closure element 2 in the direction of the outlet 15. Then, the fluid leaves the device 1 through the outlet 15 and can be guided from there either into a tank and collected there or guided by a "bypass" back to the pump P. The consumer V is therefore not supplied with fluid under pressure in the case of the valve position represented in FIG. 1. This allows for example the seamless starting of the pump P. The course of the flow is represented in FIG. 1 schematically by arrows.

Figure 2:
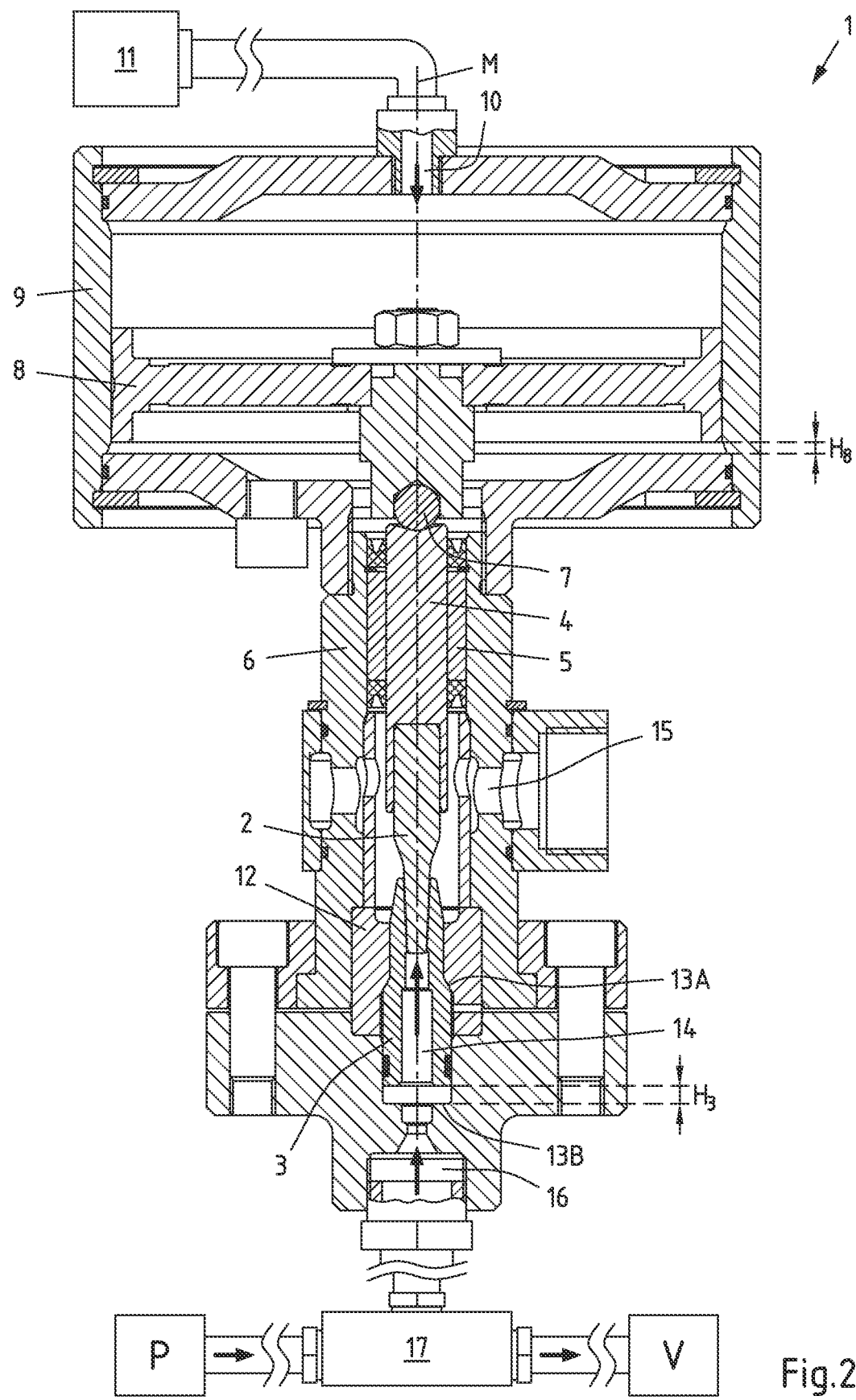

FIG. 2 shows the device from FIG. 1 in a second valve position. The regions of the device 1 already described in connection with FIG. 1 are provided in FIG. 2 with corresponding reference numerals. In the case of the situation represented in FIG. 2, the pressurised air unit 11 is activated so that air is guided via the pressurised air opening 10 into the cylinder housing 9 such that the piston 8 is displaced downwards in the direction of the valve seat 3. This results in the closure element 2 and the valve seat 3 being compressed, it thus concerns a closed valve position. In the case of the position shown in FIG. 2, the valve seat 3 abuts on the upper stop 13A. Owing to the "floating" mounting of the valve seat 3, the valve seat 3 can, however, also assume any other position between the upper stop 13A and the lower stop 13B, with the position depending on the relationship of the fluid pressures above and below the valve seat 3.

In the position shown in FIG. 2, the path to the outlet 15 is blocked such that the fluid flows from the pump P through the T-piece to the consumer V. This valve position is not desired in practice in the case of throttle valves, but serves to illustrate the mode of functioning. The piston 8 can still be displaced downwards by a stroke $H_8$ in the direction of the valve seat 3, before it abuts on a lower stop in its cylinder housing 9. In the case of the closed valve position, the stroke $H_3$ between the valve seat 3 and its lower stop 13B is preferably greater than the stroke $H_8$ between the piston 8 and tis lower stop. The advantage of this relationship between the stroke $H_3$ and the stroke $H_8$ is described below on the basis of FIG. 4.

Figure 3:
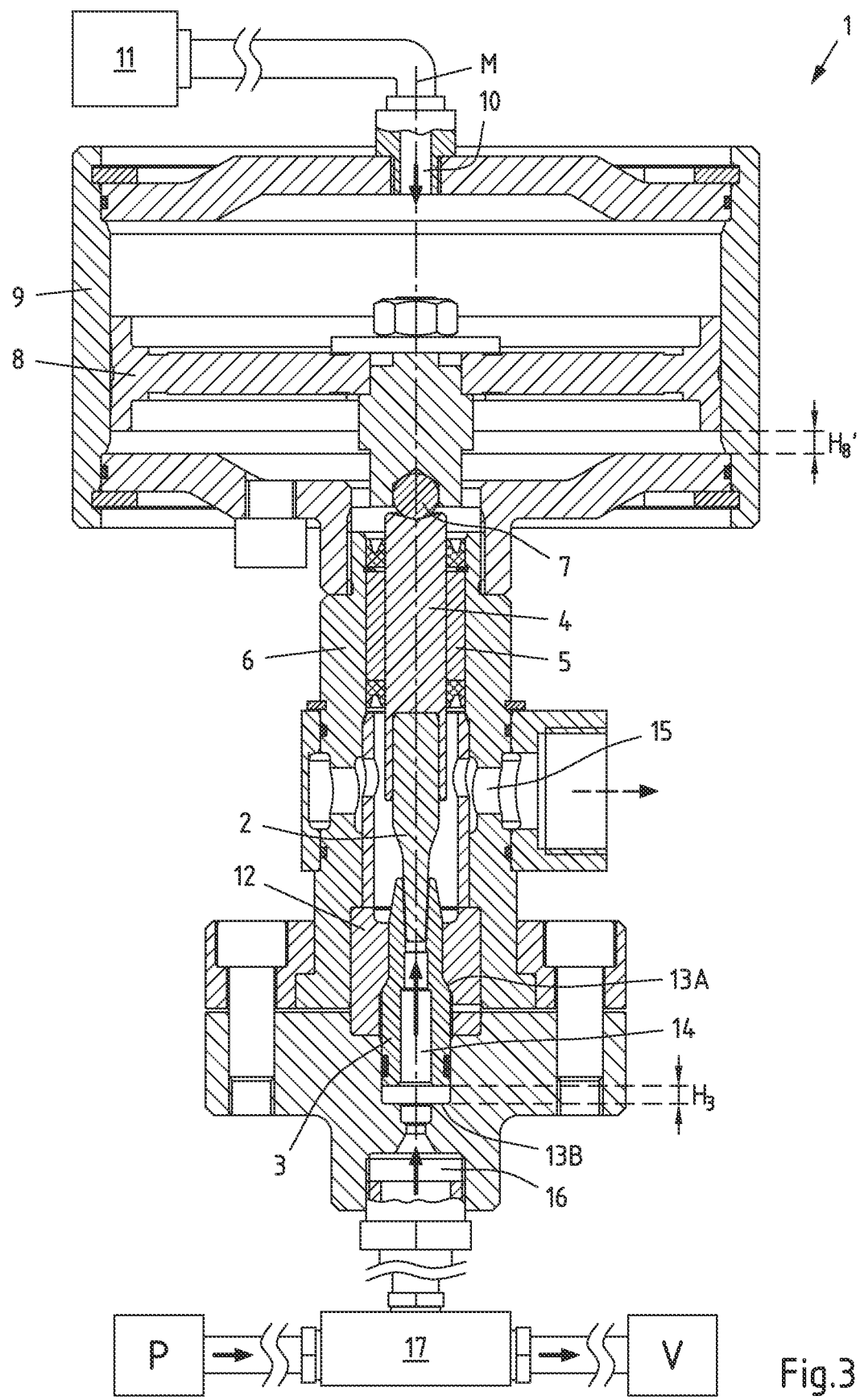

FIG. 3 shows the device from FIG. 1 in a third valve position. The regions of the device 1 already described in connection with FIG. 1 and FIG. 2 are provided in FIG. 3 with corresponding reference numerals. In the case of the position shown in FIG. 3, the piston 8 is gradually displaced upwards such that an increased stroke $H_8'$ is set. It thus concerns a slightly opened, i.e. "throttled" valve position. In the case of this valve position, a part of the fluid can flow out via the outlet 15. In this way, the fluid pressure prevailing between the pump P and the consumer V can be regulated as a function of the pneumatic pressure prevailing in the cylinder housing 9.

Figure 4:
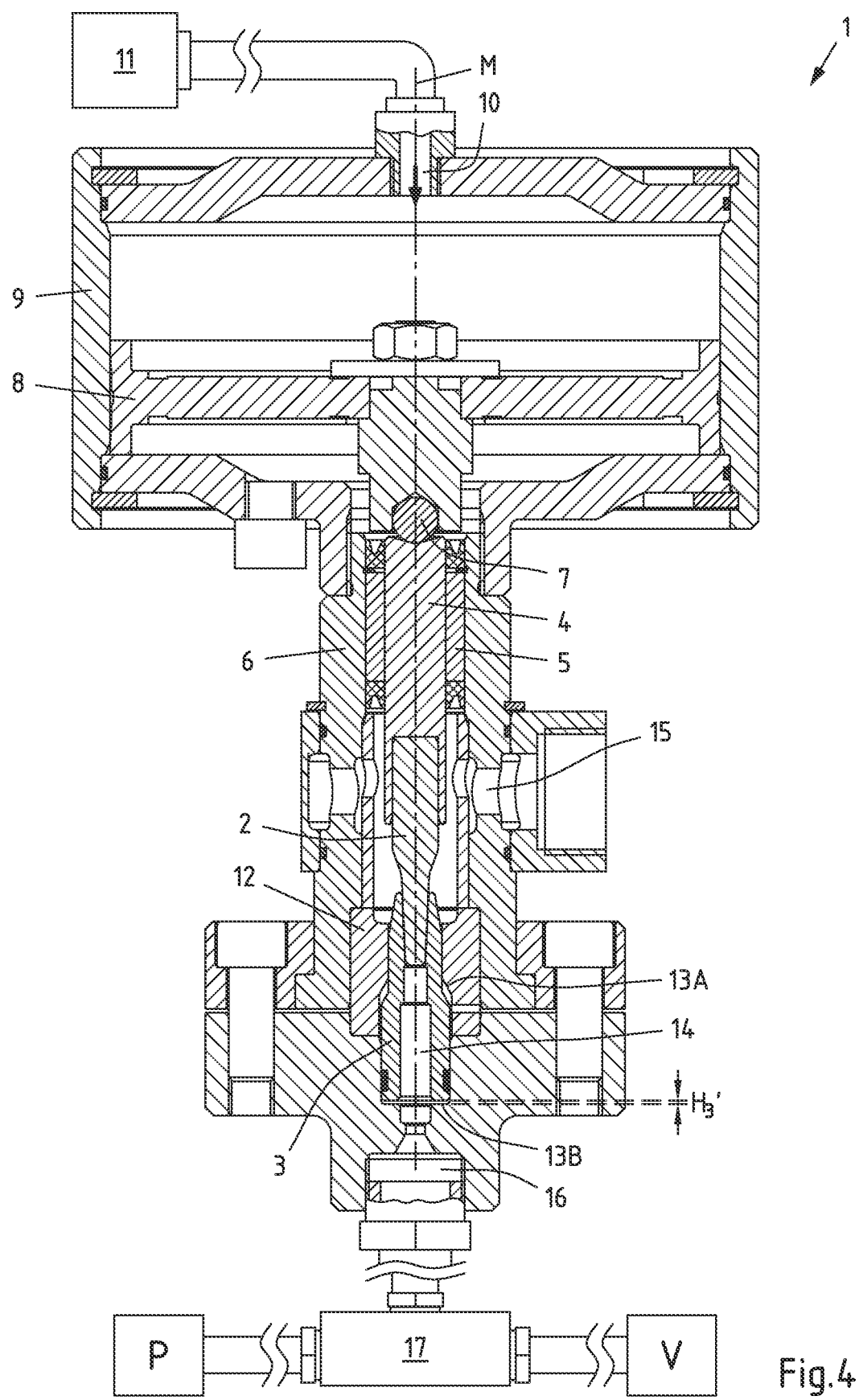

In FIG. 4, the device from FIG. 1 is shown in a fourth valve position. The regions of the device 1 already described in connection with FIG. 1 to FIG. 3 are also provided in FIG. 4 with corresponding reference numerals. Even in the situation represented in FIG. 4, the pressurised air unit 11 is activated such that air is guided via the pressurised air opening 10 into the cylinder housing 9, whereby the piston 8 is displaceable downwards in the direction of the valve seat 3. Unlike FIG. 1 to FIG. 3 however, in the position shown in FIG. 4, the pump P is deactivated or has failed, which results in a sudden drop in pressure in the region between the pump P and the consumer V. In the case of such a, usually abrupt, drop in pressure, there is the danger, in the case of conventional devices with rigid valve seat, that the two valve parts (valve plug and valve seat) become stuck owing to the impact-like loading. In the case of the device 1 according to the invention, a "floating" valve seat 3 is in contrast provided which is mounted so as to be movable in the direction of the central axis M. In particular, it is provided that in the case of a closed valve position, the stroke $H_3$ between the valve seat 3 and its lower stop 13B is greater than the stroke $H_8$ between the piston 8 and its lower stop (see FIG. 2). This leads to the valve seat 3 and the piston 8, in the case of a sudden drop in pressure on one side owing to the balance no longer existing, being pressed into one direction. In FIG. 4, it is discernible that the valve seat 3 and the piston 8, as a result of a drop in pressure in the region of the inlet 16, have been displaced "downwards" (i.e. in the direction of the inlet 16), with the piston 8, owing to its shorter stroke $H_8$ in this displacement direction, abutting on its lower stop earlier than the valve seat 3 abuts on its lower stop 13B. Owing to the remaining (rest of) stroke $H_3'$, the valve seat 3 can be moved even further in the direction of the inlet 16 and become loose from the closure element 2 here. The movability of the valve seat 3 also leads to the fact that, in the case of the deflection movement of the valve seat 3 (e.g. from the upper stop 13A in the direction of the lower stop 13B) owing to friction, movement energy can be converted into heat. This leads to a smoother stopping of the valve seat 3 and therefore to a reduced risk of becoming stuck. The closure element 2 can therefore also be pulled out of the valve seat 3 without becoming stuck following an abrupt drop in pressure when the "counter pressure" acting on the piston 8 is reduced (FIG. 4 shows a slightly opened valve position).

LIST OF REFERENCE NUMERALS

1: device
2: closure element
3: valve seat
4: closure element support

5: valve guide
6: valve housing
7: ball
8: piston
9: cylinder housing
10: pressurised air opening
11: pressurised air unit
12: valve seat guide
13A: upper stop
13B: lower stop
14: channel
15: outlet
16: inlet
17: T-piece
$H_3$, $H_3'$: stroke (of the valve seat 3)
$H_8$, $H_8'$: stroke (of the piston 8)
M: central axis
P: pump
V: consumer

The invention claimed is:

1. A device for regulating the pressure of fluids, comprising:
   a valve housing with an inlet and with an outlet,
   a closure element, which is arranged inside the valve housing,
   a valve seat, which is arranged inside the valve housing, and
   a cylinder housing with a piston mounted so as to be movable therein and which is connected to the closure element,
   wherein the closure element is mounted so as to be movable,
   wherein the closure element and the valve seat are arranged such that the connection between the inlet and the outlet can be opened and partially or fully closed, and
   wherein the valve seat is mounted so as to be movable, wherein
   a stroke between the valve seat and a lower stop is greater in the case of the closed valve position than a stroke between the piston and the lower stop.

2. The device according to claim 1, wherein the valve seat is mounted so as to be linearly movable between a first stop and a second stop.

3. The device according to claim 1, wherein the valve seat has a stroke in the range between 2 mm and 20 mm.

4. The device according to claim 1, wherein the valve seat is mounted so as to be movable in a valve seat guide and/or in that the closure element is mounted so as to be movable in a valve guide.

5. The device according to claim 1, wherein the closure element is designed as a valve plug.

6. The device according to claim 1, wherein the valve seat has a channel.

7. The device according to claim 1, wherein the cylinder housing has a pressurised air opening for connecting a pressurised air inlet.

8. The device according to claim 1, further comprising a T-piece connected to the inlet for connecting a pump and a consumer.

9. The device according to claim 1, wherein the device is configured to be used in a high-pressure system under at least 1000 bar.

10. The device of claim 9, wherein the device is configured to be used in a high-pressure system under at least 2000 bar.

* * * * *